US009671908B2

United States Patent
Cheng et al.

(10) Patent No.: US 9,671,908 B2
(45) Date of Patent: Jun. 6, 2017

(54) TOUCH PANEL FOR MULTI-TOUCH FUNCTION OF AN IN CELL CAPACITIVE TOUCH PANEL IN A TWISTED NEMATIC MODE, DRIVING METHOD THEREOF, AND DISPLAY DEVICE THEREOF

(71) Applicant: BOE TECHNOLOGY GROUP CO., LTD., Beijing (CN)

(72) Inventors: Hongfei Cheng, Beijing (CN); Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 148 days.

(21) Appl. No.: 14/422,802

(22) PCT Filed: Jun. 30, 2014

(86) PCT No.: PCT/CN2014/081197
§ 371 (c)(1),
(2) Date: Feb. 20, 2015

(87) PCT Pub. No.: WO2015/074421
PCT Pub. Date: May 28, 2015

(65) Prior Publication Data
US 2016/0041642 A1 Feb. 11, 2016

(30) Foreign Application Priority Data

Nov. 20, 2013 (CN) .......................... 2013 1 0589956

(51) Int. Cl.
*G06F 3/044* (2006.01)
*G09G 3/36* (2006.01)
*G06F 3/047* (2006.01)
*G06F 3/041* (2006.01)

(52) U.S. Cl.
CPC .............. *G06F 3/044* (2013.01); *G06F 3/047* (2013.01); *G06F 3/0412* (2013.01);
(Continued)

(58) Field of Classification Search
CPC ........ G06F 3/044; G06F 3/047; G06F 3/0412; G06F 3/0416; G06F 2203/04112; G09G 3/3658; G09G 2310/08; G09G 2354/00
See application file for complete search history.

(56) References Cited

U.S. PATENT DOCUMENTS

| 2006/0086978 | A1 | 4/2006 | Kobayashi | |
|---|---|---|---|---|
| 2014/0111466 | A1* | 4/2014 | Kim ........................ | G06F 3/044 345/174 |
| 2015/0091845 | A1* | 4/2015 | Park ........................ | G06F 3/044 345/174 |

FOREIGN PATENT DOCUMENTS

| CN | 101825787 A | 9/2010 |
|---|---|---|
| CN | 102207655 A | 10/2011 |

(Continued)

OTHER PUBLICATIONS

Office Action dated Jan. 26, 2016 issued in corresponding Chinese Application No. 201310589956.5.
(Continued)

*Primary Examiner* — Larry Sternbane
(74) *Attorney, Agent, or Firm* — Nath, Goldberg & Meyer; Joshua B. Goldberg; Christopher Thomas

(57) ABSTRACT

The present subject matter relates to a touch panel, a driving method thereof, and a display device, for multi-touch function of an in cell capacitive touch panel in a twisted nematic mode. The touch panel includes an array substrate and a color filter substrate arranged oppositely, and a liquid crystal layer formed therebetween. The array substrate includes gate lines, data lines and pixel units each formed by adjacent gate lines and adjacent data lines arranged crosswise. Each pixel unit includes a thin film transistor and a pixel electrode, and the color filter substrate includes common electrodes. The pixel electrodes load data signals through the data lines in a display period, and load driving signals (Continued)

through the data lines in a touch-control period. The common electrodes load common electrode signals through common electrode lines in the display period, and output sensing signals through the common electrode lines in the touch-control period.

13 Claims, 2 Drawing Sheets

(52) U.S. Cl.
CPC .. *G09G 3/3648* (2013.01); *G06F 2203/04112* (2013.01); *G09G 2310/08* (2013.01); *G09G 2354/00* (2013.01)

(56) References Cited

FOREIGN PATENT DOCUMENTS

| | | |
|---|---|---|
| CN | 103019492 A | 4/2013 |
| CN | 103034386 A | 4/2013 |
| CN | 103150070 A | 6/2013 |
| CN | 202976051 U | 6/2013 |
| CN | 103207720 A | 7/2013 |
| CN | 103761014 A | 4/2014 |
| EP | 2 620 846 A1 | 7/2013 |

OTHER PUBLICATIONS

Search Report issued in International Application No. PCT/CN2014/081197, dated Jun. 30, 2014 (Jun. 30, 2014).

* cited by examiner

TOUCH PANEL FOR MULTI-TOUCH FUNCTION OF AN IN CELL CAPACITIVE TOUCH PANEL IN A TWISTED NEMATIC MODE, DRIVING METHOD THEREOF, AND DISPLAY DEVICE THEREOF

This is a National Phase Application filed under 35 U.S.C. 371 as a national stage of PCT/CN2014/081197 filed on Jun. 30, 2014, an application claiming the benefit to Chinese application No. 201310589956.5 filed on Nov. 20, 2013; the content of each of which is hereby incorporated by reference in its entirety.

FIELD OF THE INVENTION

The present invention relates to the field of display technology, and particularly relates to a touch panel, a driving method thereof, and a display device.

BACKGROUND OF THE INVENTION

Touch panels can be classified into add on mode touch panels, on cell touch panels and in cell touch panels according to composition structure, and can be classified into resistive touch panels and capacitive touch panels according to touch-control principle. A in cell capacitive touch panel is a touch panel formed by embedding touch-control electrodes of a capacitive touch panel within a liquid crystal display panel.

At present, in order to embed a capacitive in cell touch panel within a liquid crystal display panel, it is necessary to form some touch-control electrodes and signal lines additionally within the liquid crystal display panel, which results in a complex manufacturing process; furthermore, the above in cell capacitive touch panel is generally applied in a fringe field switching (FFS for short) mode, and a technical solution which can implement a multi-touch function of the in cell capacitive touch panel in a twisted nematic (TN for short) mode has not been disclosed yet.

SUMMARY OF THE INVENTION

The present invention provides a touch screen, a driving method thereof and a display device, in which there is no need to additionally provide the touch-control electrodes and corresponding signal lines for achieving the touch-control function, accordingly, there is no need to additionally add corresponding steps in the manufacturing process either, and the multi-touch function of the in cell capacitive touch panel in the TN mode can be achieved.

In order to achieve the above object, the present invention provides a touch panel comprising an array substrate and a color filter substrate arranged oppositely, and a liquid crystal layer formed between the color filter substrate and the array substrate, the array substrate comprises a plurality of gate lines, a plurality of data lines and a plurality of pixel units each formed by adjacent gate lines and adjacent data lines arranged crosswise, each pixel unit comprises a thin film transistor and a pixel electrode, and the color filter substrate comprises a plurality of common electrodes;

the pixel electrodes are used for loading data signals through the data lines in a display period of the touch panel, and loading driving signals through the data lines in a touch-control period of the touch panel; and the common electrodes are used for loading common electrode signals through common electrode lines in the display period of the touch panel, and outputting sensing signals through the common electrode lines in the touch-control period of the touch panel.

Optionally, the plurality of common electrodes are a plurality of strip-like common electrodes which are arranged in parallel with each other.

Optionally, the number of the common electrodes is larger than one and smaller than or equal to the number of the gate lines.

Optionally, in the touch-control period of the touch panel, all of the gate lines are enabled simultaneously to turn on all of the thin film transistors, and the pixel electrodes in the same column are electrically connected to one data line corresponding to said column of pixel electrodes through the thin film transistors corresponding thereto, respectively.

Optionally, each common electrode is arranged perpendicularly to each column of pixel electrodes in a cross manner.

Optionally, a same driving signal is loaded on a plurality of adjacent columns of pixel electrodes.

Optionally, different driving signals are loaded on the respective columns of pixel electrodes.

In order to achieve the above object, the present invention provides a display device, which comprises the above touch panel.

In order to achieve the above object, the present invention provides a driving method of a touch panel, the touch panel comprises an array substrate and a color filter substrate which are arranged oppositely, and a liquid crystal layer formed between the color filter substrate and the array substrate, the array substrate comprises a plurality of gate lines, a plurality of data lines and a plurality of pixel units each formed by adjacent gate lines and adjacent data lines arranged crosswise, each pixel unit comprises a thin film transistor and a pixel electrode, the color filter substrate comprises a plurality of common electrodes; and the driving method comprises:

in a display period of the touch panel, loading, by the pixel electrodes, data signals through the data lines, and loading, by the common electrodes, common electrode signals through common electrode lines; and in a touch-control period of the touch panel, loading, by the pixel electrodes, driving signals through the data lines, and outputting, by the common electrodes, sensing signals through the common electrode lines.

Optionally, the driving method comprises: in the touch-control period of the touch panel, enabling all of the gate lines simultaneously to output turning-on signals to all of the thin film transistors simultaneously, and turn on all of the thin film transistors, so that the pixel electrodes in the same column are electrically connected to one data line corresponding to said column of pixel electrodes through the thin film transistors corresponding thereto, respectively.

The present invention has the following beneficial effects:

in the technical solutions of a touch panel, a driving method thereof and a display device provided by the present invention, the pixel electrodes load the data signals through the data lines in the display period, and load the driving signals through the data lines in the touch-control period, the common electrodes load the common electrode signals through the common electrode lines in the display period, and output the sensing signals through the common electrode lines in the touch-control period, and thus the pixel electrodes and the common electrodes can achieve the image display function in the display period, and can achieve the touch-control function in the touch-control period. Therefore, in the present invention, there is no need to additionally provide the touch-control electrodes and corresponding signal lines for achieving the touch-control function, accordingly, there is no need to additionally add corresponding steps in the manufacturing process either, and the multi-touch function of the in cell capacitive touch panel in the TN mode can be achieved.

DETAILED DESCRIPTION OF THE EMBODIMENTS

To enable those skilled in the art to better understand the technical solutions of the present invention, a touch panel, a driving method thereof and a display device provided by the present invention will be described in detail below in conjunction with the accompanying drawings.

An embodiment of the present invention provides a touch panel, which may comprise an array substrate and a color filter substrate arranged oppositely, and a liquid crystal layer formed between the color filter substrate and the array substrate.

Figure 1:
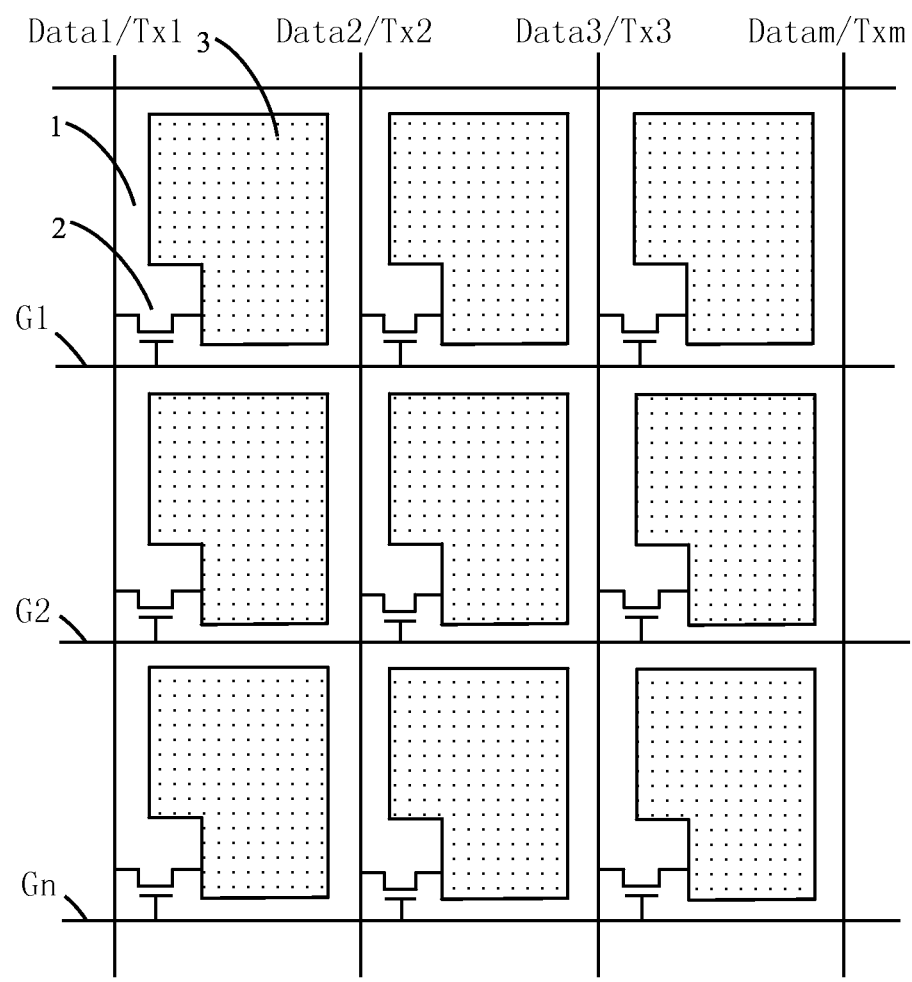
FIG. 1 is a schematic diagram of a structure of an array substrate in an embodiment of the present invention.

FIG. 1 is a schematic diagram of a structure of an array substrate in the embodiment of the present invention, as shown in FIG. 1, the array substrate comprises: a gate line G1, a gate line G2, . . . , a gate line Gn (i.e., a plurality of gate lines), a data line Data 1, a data line Data 2, . . . , a data line Datam (i.e., a plurality of data lines), and a plurality of pixel units 1 each formed by adjacent gate lines and adjacent data lines arranged crosswise, and each pixel unit 1 comprises a thin film transistor 2 and a pixel electrode 3. The gate lines G1, G2, . . . , Gn and the data lines Data1, Data2, . . . , Datam define pixel units 1. The pixel electrodes 3 are used for loading data signals through the data lines Data in a display period of the touch panel, and loading driving signals through the data lines Data in a touch-control period of the touch panel.

Figure 2:
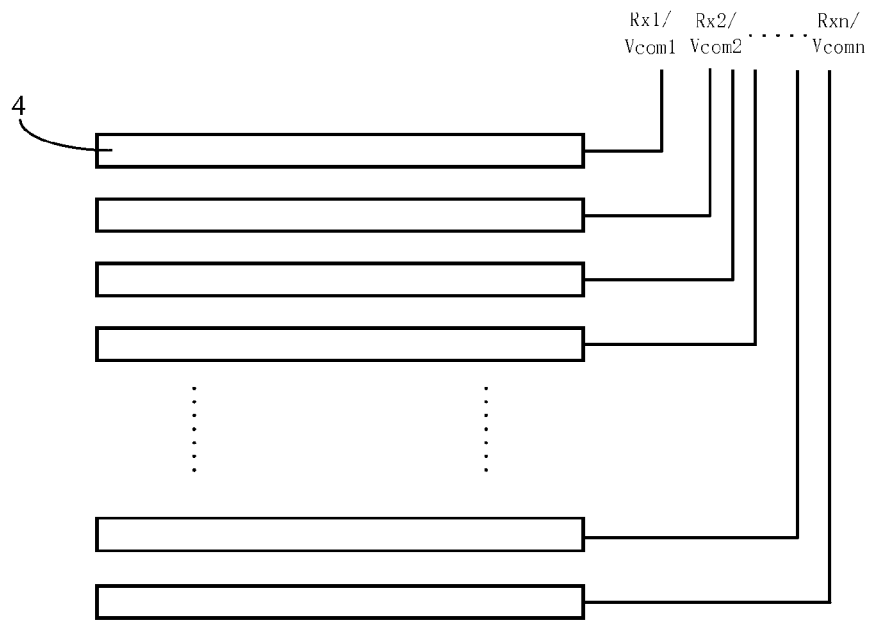
FIG. 2 is a schematic diagram of a structure of common electrodes on a color filter substrate in an embodiment of the present invention.

FIG. 2 is a schematic diagram of a structure of common electrodes on a color filter substrate in an embodiment of the present invention, as shown in FIG. 2, the color filter substrate comprises a plurality of common electrodes 4. The common electrodes 4 are used for loading common electrode signals through common electrode lines Vcom in the display period of the touch panel, and outputting sensing signals through the common electrode lines Vcom in the touch-control period of the touch panel.

In the present embodiment, the common electrodes 4 are strip-like common electrodes, for example, the common electrodes 4 are strip-like common electrodes having a rectangular shape. The plurality of the common electrodes 4 are arranged in parallel with each other. In practical applications, the common electrodes 4 may have other shape, and may be arranged in other positional relationship.

The number of the common electrodes 4 may be set according to touch-control precision of the touch panel. Preferably, the number of the common electrodes 4 is larger than one and smaller than or equal to the number of the gate lines n.

In the present embodiment, in the touch-control period of the touch panel, all of the gate lines G1, G2, . . . , Gn are enabled simultaneously, namely, all of the gate lines output signals that turn on all of the thin film transistors 2, and the pixel electrodes 3 in the same column are electrically connected with each other through the thin film transistors 2 corresponding thereto and one data line corresponding to said column of pixel electrodes 3, respectively, that is, each pixel electrode 3 in a same column is electrically connected to a same data line through the thin film transistor 2 which belongs to the same pixel unit as said pixel electrode 3, so that the pixel electrodes 3 in the same column are electrically connected with each other to form a strip-like driving electrode. As shown in FIG. 2, each common electrode 4 is disposed transversely, and therefore, each common electrode 4 is arranged perpendicularly to each column of pixel electrodes 3 in a cross manner.

Figure 3:
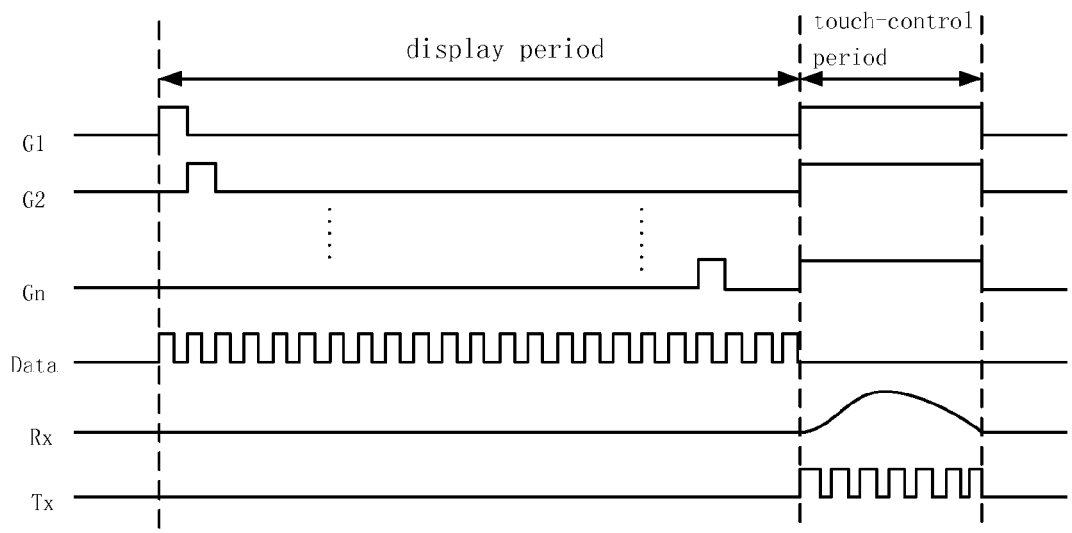
FIG. 3 is a timing diagram for driving a touch panel provided by an embodiment of the present invention.

FIG. 3 is a timing diagram for driving a touch panel provided by an embodiment of the present invention. The operating principle of the touch panel provided by the embodiment of the present invention will be described in detail below in conjunction with FIGS. 1 to 3. A work period of the touch panel provided by the embodiment of the present invention may be divided into a display period and a touch-control period.

In the display period, the gate lines G1, G2, . . . , Gn are sequentially enabled to respectively output signals for turning on a thin film transistor (turning-on signals) to the respective rows of thin film transistors electrically connected thereto, so as to sequentially turn on the respective rows of thin film transistors 2, and the data lines Data1, Data2, . . . , Datam output, via each row of thin film transistors 2 which are turned on, data signals to the pixel electrodes 3 corresponding to said row of thin film transistors 2, so as to load the data signals on the pixel electrodes 3. At this time, the plurality of common electrodes 4 on the color filter substrate load common electrode signals through common electrode lines Vcom1, Vcom2, . . . , Vcomn, respectively. Under the cooperation of the pixel electrodes 3 on the array substrate and the common electrodes 4 on the color filter substrate, the touch panel achieves an image display function in the display period.

In the touch-control period, the gate lines G1, G2, . . . , Gn are all enabled simultaneously to output the signals for turning on a thin film transistor (turning-on signals) to all of the thin film transistors 2 simultaneously, so as to turn on all of the thin film transistors 2, the pixel electrodes 3 in the same column are electrically connected with each other through the thin film transistors 2 corresponding thereto and one data line corresponding to said column of pixel electrodes 3, respectively, so that said column of pixel electrodes 3 are electrically connected with each other to form a strip-like driving electrode, that is, each pixel electrode 3 in a same column is electrically connected to a same data line through the thin film transistor 2 which belongs to the same pixel unit as the pixel electrode 3. At this time, the data lines Data are functionally switched to driving signal lines Tx, the pixel electrodes 3 are functionally switched to touch driving electrodes, and the driving signal lines Tx (i.e., data lines Data) output driving signals to the respective columns of pixel electrodes 3 electrically connected thereto to load the driving signals on the respective columns of pixel electrodes 3. As shown in FIG. 1, the data lines Data may comprise: a data line Data1, a data line Data2, . . . , and a data line Datam, then the driving signal lines Tx may comprise: a driving signal line Tx1, a driving signal line Tx2, . . . , and a driving signal line Txm, and the driving signal lines Tx1 to Txm output the driving signals to the respective columns of pixel electrodes 3 electrically connected thereto, respectively. Meanwhile, the common electrode lines Vcom are functionally switched to sensing signal lines Rx, the common electrodes 4 are functionally switched to the touch sensing electrodes, and the plurality of common electrodes 4 output the sensing signals through the sensing signal lines Rx (i.e., common electrode lines Vcom). As shown in FIG. 2, the common electrode lines Vcom may comprise: a common electrode line Vcom1, a common electrode line Vcom2, . . . , and a common electrode line Vcomn, then the sensing signal lines Rx may comprise: a sensing signal line Rx1, a sensing signal line Rx2, . . . , and a sensing signal line Rxn, and the plurality of common electrodes 4 may output the sensing signals through the sensing signal lines Rx1 to Rxm electrically connected thereto, respectively. During the touch-control period, mutual capacitances are generated between the touch driving electrodes (i.e., pixel electrodes 3) and the touch sensing electrodes (i.e., common electrodes 4), In the present embodiment, the mutual capacitances are generated by strip-like touch driving electrodes (formed by the pixel electrodes 3 in the same column and electrically connected with each other) and strip-like touch sensing electrodes, so that the touch panel can achieve the touch-control function more precisely. Specific operating process of the touch panel in the touch-control period is as follows: the touch driving electrodes load the driving signals through the driving signal lines Tx, the sensing signal lines Rx receive and output the sensing signals by means of coupling of mutual capacitances, in the above process, if a human body contacts the touch panel, a human body electric field will act on the mutual capacitances formed by the touch driving electrodes and the touch sensing electrodes, which affects the coupling between the two electrodes near the touch point, changes the value of the mutual capacitance, and further changes the sensing signal received by the sensing signal line Rx. Therefore, position of the touch point can be determined by detecting a change in the sensing signals received by the sensing signal lines Rx.

In the present embodiment, in the touch-control period, the driving signals loaded on the respective columns of the pixel electrodes 3 are different. In practical applications, optionally, the driving signals loaded on multiple adjacent columns of pixel electrodes 3 may be the same. Specifically, as shown in FIG. 1, for example, a same driving signal is loaded on a column of pixel electrodes 3 electrically connected to the driving signal line Tx1, a column of pixel electrodes 3 electrically connected to the driving signal line Tx2 and a column of pixel electrodes 3 electrically connected to the driving signal line Tx3, and these three columns of pixel electrodes 3 may serve as one column of touch driving electrodes and are controlled by a same driving signal.

As shown in FIG. 3, the signal lines in the present embodiment are used in a time-sharing manner, and thereby the touch panel is driven in different ways in different time periods. In the display period, the data lines Data are used for transmitting data signals, and the common electrode lines Vcom are used for transmitting the common electrode signals; in the touch-control period, the original data lines Data serve as the driving signal lines Tx, and are used for transmitting the driving signals, and the original common electrode lines Vcom serve as the sensing signal lines, and are used for transmitting the sensing signals Rx.

For example, it takes the touch panel 16.7 ms to display one frame of image, in which the display period occupies 12.7 ms, and the touch-control period occupies 4 ms. In practical applications, durations respectively occupied by the display period and the touch-control period in the time period of displaying one frame of image may be appropriately adjusted according to processing capacity of an integrated circuit (IC for short) chip, and are not limited here.

The touch panel provided by the present embodiment can be implemented by a liquid crystal display in a TN mode. Specifically, a plurality of strip-like common electrodes may be formed by patterning a common electrode on a color filter substrate in the liquid crystal display in the TN mode. The strip-like common electrodes have different functions in different time periods, and specifically, they serve as the common electrodes in the display period, and serve as the touch sensing electrodes in the touch-control period. Moreover, the pixel electrodes on an array substrate in the liquid crystal display in the TN mode have different functions in different time periods as well, and specifically, they serve as the pixel electrodes in the display period, and serve as the touch driving electrodes in the touch-control period. The touch panel in the present embodiment can achieve a display function and a touch-control function in different time periods respectively, and can achieve the multi-touch function in the TN mode.

In the touch panel provided by the present embodiment, the pixel electrodes load the data signals through the data lines in the display period, and load the driving signals through the data lines in the touch-control period, the common electrodes load the common electrode signals through the common electrode lines in the display period, and output the sensing signals through the common electrode lines in the touch-control period, and thus the pixel electrodes and the common electrodes can achieve the image display function in the display period, and achieve the touch-control function in the touch-control period. Therefore, in the present embodiment, there is no need to additionally provide the touch-control electrodes and corresponding signal lines for achieving the touch-control function, accordingly, there is no need to additionally add corresponding steps in the manufacturing process either, and the multi-touch function of the in cell capacitive touch panel in the TN mode can be achieved.

An embodiment of the present invention provides a display device, which may comprise a touch panel, the touch panel may be the touch panel provided by the above embodiment, and the details thereof are not to be described herein.

In the display device provided by the present embodiment, the pixel electrodes load the data signals through the data lines in the display period, and load the driving signals through the data lines in the touch-control period, the common electrodes load the common electrode signals through the common electrode lines in the display period, and output the sensing signals through the common electrode lines in the touch-control period, and thus the pixel electrodes and the common electrodes can achieve the image display function in the display period, and achieve the touch-control function in the touch-control period. Therefore, in the present embodiment, there is no need to additionally provide the touch-control electrodes and corresponding signal lines for achieving the touch-control function, accordingly, there is no need to additionally add corresponding steps in the manufacturing process either, and the multi-touch function of the in cell capacitive touch panel in the TN mode can be achieved.

An embodiment of the present invention further provides a driving method of a touch panel, the touch panel comprises an array substrate and a color filter substrate which are arranged oppositely, and a liquid crystal layer formed between the array substrate and the color filter substrate, the array substrate comprises a plurality of gate lines, a plurality of data lines and a plurality of pixel units formed by adjacent gate lines and adjacent data lines arranged crosswise, each pixel unit comprises a thin film transistor and a pixel electrode, and the color filter substrate comprises a plurality of common electrodes.

The driving method comprises the following steps.

In a display period, the pixel electrodes load data signals through the data lines, and the common electrodes load common electrode signals through common electrode lines. Specifically, the plurality of gate lines are sequentially enabled to output turning-on signals to the respective rows of thin film transistors electrically connected thereto, respectively, so as to sequentially turn on the respective rows of thin film transistors, and the plurality of data lines output, via each row of thin film transistors which are turned on, the data signals to the pixels electrodes corresponding to said row of thin film transistors, so as to load the data signals on the pixel electrodes; the plurality of common electrodes load the common electrode signals through the common electrode lines, respectively.

In a touch-control period, the pixel electrodes load driving signals through the data lines, and the common electrodes output sensing signals through the common electrode lines.

Further, the driving method further comprise: in the touch-control period, enabling all of the gate lines simultaneously to output the turning-on signals to all of the thin film transistors simultaneously, and turn on all of the thin film transistors, so that the pixel electrodes in the same column are electrically connected to one data line corresponding to said column of pixel electrodes through the thin film transistors corresponding thereto, respectively, that is, each pixel electrode in a same column is electrically connected to a same data line through the thin film transistor which belongs to the same pixel unit as the pixel electrode so that said column of pixel electrodes are electrically connected with each other.

The driving method of a touch panel provided by the present embodiment may be used to drive the touch panel provided in the above embodiment, and the description of the touch panel may be obtained by referring to the above embodiment, and is not repeated here.

In the driving method of a touch panel provided by the present embodiment, the pixel electrodes load the data signals through the data lines in the display period, and load the driving signals through the data lines in the touch-control period, the common electrodes load the common electrode signals through the common electrode lines in the display period, and output the sensing signals through the common electrode lines in the touch-control period, and thus the pixel electrodes and the common electrodes can achieve the image display function in the display period, and achieve the touch-control function in the touch-control period. Therefore, in the present embodiment, there is no need to additionally provide the touch-control electrodes and corresponding signal lines for achieving the touch-control function, accordingly, there is no need to additionally add corresponding steps in the manufacturing process either, and the multi-touch function of the in cell capacitive touch panel in the TN mode can be achieved.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A touch panel, comprising an array substrate and a color filter substrate arranged oppositely, and a liquid crystal layer formed between the color filter substrate and the array substrate, wherein, the array substrate comprises a plurality of gate lines, a plurality of data lines and a plurality of pixel units each formed by adjacent gate lines and adjacent data lines arranged crosswise, each pixel unit comprises a thin film transistor and a pixel electrode, and the color filter substrate comprises a plurality of common electrodes;

the pixel electrodes are used for loading data signals through the data lines in a display period of the touch panel, and loading driving signals through the data lines in a touch-control period of the touch panel;

the common electrodes are used for loading common electrode signals through common electrode lines in the display period of the touch panel, and outputting sensing signals through the common electrode lines in the touch-control period of the touch panel; and wherein, in the touch-control period of the touch panel, all of the gate lines are enabled simultaneously to turn on all of the thin film transistors, and the pixel electrodes in the same column are electrically connected to one data line corresponding to said column of pixel electrodes through the thin film transistors corresponding thereto, respectively.

2. The touch panel according to claim 1, wherein, the plurality of common electrodes are a plurality of strip-like common electrodes which are arranged in parallel with each other.

3. The touch panel according to claim 2, wherein, the number of the common electrodes is larger than one and smaller than or equal to the number of the gate lines.

4. The touch panel according to claim 1, wherein, each common electrode is arranged perpendicularly to each column of pixel electrodes in a cross manner.

5. The touch panel according to claim 1, wherein, a same driving signal is loaded on a plurality of adjacent columns of pixel electrodes.

6. The touch panel according to claim 1, wherein, different driving signals are loaded on the respective columns of pixel electrodes.

7. A display device, comprising the touch panel according to claim 1.

8. The display device according to claim 7, wherein, the plurality of common electrodes are a plurality of strip-like common electrodes which are arranged in parallel with each other.

9. The display device according to claim 8, wherein, the number of the common electrodes is larger than one and smaller than or equal to the number of the gate lines.

10. The display device according to claim 7, wherein, each common electrode is arranged perpendicularly to each column of pixel electrodes in a cross manner.

11. The display device according to claim 7, wherein, a same driving signal is loaded on a plurality of adjacent columns of pixel electrodes.

12. The display device according to claim 7, wherein, different driving signals are loaded on the respective columns of pixel electrodes.

13. A driving method of a touch panel, wherein, the touch panel comprises an array substrate and a color filter substrate arranged oppositely, and a liquid crystal layer formed between the color filter substrate and the array substrate, the array substrate comprises a plurality of gate lines, a plurality of data lines and a plurality of pixel units each formed by adjacent gate lines and adjacent data lines arranged crosswise, each pixel unit comprises a thin film transistor and a pixel electrode, the color filter substrate comprises a plurality of common electrodes; and the driving method comprises:

in a display period of the touch panel, loading, by the pixel electrodes, data signals through the data lines, and loading, by the common electrodes, common electrode signals through common electrode lines;

in a touch-control period of the touch panel, loading, by the pixel electrodes, driving signals through the data lines, and outputting, by the common electrodes, sensing signals through the common electrode lines; and in the touch-control period of the touch panel, enabling all of the gate lines simultaneously to output turning-on signals to all of the thin film transistors simultaneously, and turn on all of the thin film transistors, so that the pixel electrodes in the same column are electrically connected to one data line corresponding to said column of pixel electrodes through the thin film transistors corresponding thereto, respectively.

\* \* \* \* \*